(12) United States Patent
Yandrasits et al.

(10) Patent No.: US 7,514,481 B2
(45) Date of Patent: *Apr. 7, 2009

(54) POLYMER ELECTROLYTES CROSSLINKED BY E-BEAM

(75) Inventors: Michael A. Yandrasits, Hastings, MN (US); Steven J. Hamrock, Stillwater, MN (US); Naiyong Jing, Woodbury, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/668,270

(22) Filed: Jan. 29, 2007

(65) Prior Publication Data

US 2007/0142563 A1  Jun. 21, 2007

Related U.S. Application Data

(62) Division of application No. 10/712,361, filed on Nov. 13, 2003, now Pat. No. 7,179,847.

(51) Int. Cl.
 *C08F 2/46* (2006.01)

(52) U.S. Cl. .............. 522/156; 522/1; 522/2; 522/150; 522/155; 522/184; 522/186; 522/187; 522/189; 427/496; 427/498; 427/501

(58) Field of Classification Search .......... 522/1, 522/2, 150, 155, 156, 184, 185, 186, 187, 522/188, 189; 427/496, 498, 501; 428/421, 428/422, 221, 297.4, 98, 156, 172
See application file for complete search history.

(56) References Cited

U.S. PATENT DOCUMENTS

| | | | |
|---|---|---|---|
| 3,282,875 A | 11/1966 | Connolly et al. |
| 3,635,926 A | 1/1972 | Gresham et al. |
| 3,784,399 A | 1/1974 | Grot |
| 3,853,828 A | 12/1974 | Wall et al. |
| 4,000,356 A | 12/1976 | Weisgerber et al. |
| 4,073,752 A | 2/1978 | Ramp |
| 4,169,023 A | 9/1979 | Sata et al. |
| 4,214,060 A | 7/1980 | Apotheker et al. |
| 4,218,542 A | 8/1980 | Ukihashi et al. |
| 4,230,549 A | 10/1980 | D'Agostino et al. |
| 4,242,498 A | 12/1980 | Rosser et al. |
| 4,268,650 A | 5/1981 | Rose |
| 4,281,092 A | 7/1981 | Breazeale |
| 4,330,654 A | 5/1982 | Ezzell et al. |
| 4,334,082 A | 6/1982 | Resnick |
| 4,391,844 A | 7/1983 | Baczek et al. |
| 4,414,159 A | 11/1983 | Resnick |
| 4,440,917 A | 4/1984 | Resnick |
| 4,454,247 A | 6/1984 | Resnick |
| 4,470,889 A | 9/1984 | Ezzell et al. |
| 4,508,603 A | 4/1985 | Ukihashi et al. |
| 4,522,952 A | 6/1985 | Klein et al. |
| 4,602,045 A | 7/1986 | Markus et al. |
| 4,686,024 A | 8/1987 | Scherer, Jr. et al. |
| 4,734,474 A | 3/1988 | Hamada et al. |
| 4,743,419 A | 5/1988 | Bierschenk |
| 4,755,567 A | 7/1988 | Bierschenk et al. |
| 4,981,932 A | 1/1991 | Blaise et al. |
| 5,260,351 A | 11/1993 | Logothetis |
| 5,264,508 A | 11/1993 | Ishibe et al. |
| 5,330,626 A | 7/1994 | Banerjee |
| 5,466,930 A | 11/1995 | Schienoff |
| 5,527,861 A | 6/1996 | Logothetis |
| 5,608,022 A | 3/1997 | Nakayama et al. |
| 5,693,748 A | 12/1997 | Ikeda et al. |
| 5,795,496 A | 8/1998 | Yen et al. |
| 5,798,417 A | 8/1998 | Howard, Jr. |
| 5,804,650 A | 9/1998 | Tsuda et al. |
| 5,852,148 A | 12/1998 | Behr et al. |
| 5,986,012 A | 11/1999 | Legare et al. |
| 6,011,074 A | 1/2000 | Sorenson et al. |
| 6,090,895 A | 7/2000 | Mao et al. |

(Continued)

FOREIGN PATENT DOCUMENTS

DE  26 24 203  12/1976

(Continued)

OTHER PUBLICATIONS

Kirk-Othmer, *Encyclopedia of Chemical Technology*, 3d ed., vol. 10, (1980), pp. 840-851.

(Continued)

*Primary Examiner*—Sanza L McClendon
(74) *Attorney, Agent, or Firm*—Philip Y. Dahl

(57) ABSTRACT

A method of making a crosslinked polymer is provided as well as the polymer so made, the method comprising the steps of: providing a highly fluorinated fluoropolymer, typically a perfluorinated fluoropolymer, comprising pendent groups which include a group according to the formula —$SO_2X$, where X is F, Cl, Br, OH, or —$O^-M^+$, where $M^+$ is a monovalent cation, and exposing said fluoropolymer to electron beam radiation so as to result in the formation of crosslinks. Typically, the method according to the present invention additionally comprises the step of: forming said fluoropolymer into a membrane, typically having a thickness of 90 microns or less, more typically 60 microns or less, and most typically 30 microns or less.

26 Claims, 2 Drawing Sheets

U.S. PATENT DOCUMENTS

| | | | |
|---|---|---|---|
| 6,224,994 B1 | 5/2001 | Asukabe et al. |
| 6,225,368 B1 | 5/2001 | D'Agostino et al. |
| 6,242,123 B1 | 6/2001 | Nezu et al. |
| 6,248,469 B1 | 6/2001 | Formato et al. |
| 6,254,978 B1 | 7/2001 | Bahar et al. |
| 6,255,370 B1 | 7/2001 | Vizcaino et al. |
| RE37,307 E | 8/2001 | Bahar et al. |
| 6,274,677 B1 | 8/2001 | Tatemoto |
| 6,277,512 B1 | 8/2001 | Hamrock et al. |
| 6,355,370 B2 | 3/2002 | Katoh et al. |
| RE37,656 E | 4/2002 | Bahar et al. |
| 6,365,769 B1 | 4/2002 | Behr et al. |
| 6,380,337 B2 | 4/2002 | Abe et al. |
| RE37,701 E | 5/2002 | Bahar et al. |
| 6,387,964 B1 | 5/2002 | D'Agostino et al. |
| 6,423,784 B1 | 7/2002 | Hamrock et al. |
| 6,426,397 B1 | 7/2002 | Armand et al. |
| 6,462,228 B1 | 10/2002 | Dams |
| 6,498,216 B1 | 12/2002 | Cheng |
| 6,503,378 B1 | 1/2003 | Fisher |
| 6,552,135 B2 | 4/2003 | Schnurnberger et al. |
| 6,624,328 B1 | 9/2003 | Guerra |
| 6,649,703 B2 | 11/2003 | Michot et al. |
| 6,667,377 B2 | 12/2003 | Feiring et al. |
| 6,670,424 B1 | 12/2003 | Michot et al. |
| 6,872,781 B2 | 3/2005 | Hedhli et al. |
| 2002/0014405 A1 | 2/2002 | Arcella et al. |
| 2002/0040106 A1 | 4/2002 | Wlassics et al. |
| 2003/0032739 A1 | 2/2003 | Kerres et al. |
| 2003/0092940 A1 | 5/2003 | Hamrock |
| 2003/0181572 A1 | 9/2003 | Tan et al. |
| 2003/0181615 A1 | 9/2003 | Ameduri et al. |
| 2003/0208014 A1 | 11/2003 | Kerres et al. |
| 2004/0121210 A1 | 6/2004 | Hamrock et al. |
| 2004/0241518 A1 | 12/2004 | Yang |
| 2005/0096442 A1 | 5/2005 | Thaler et al. |
| 2005/0107488 A1 | 5/2005 | Yandrasits et al. |
| 2005/0107489 A1 | 5/2005 | Yandrasits et al. |
| 2005/0107490 A1* | 5/2005 | Yandrasits et al. ......... 522/156 |
| 2005/0107532 A1 | 5/2005 | Guerra et al. |
| 2005/0113528 A1 | 5/2005 | Jing et al. |
| 2005/0131096 A1 | 6/2005 | Jing et al. |
| 2005/0131097 A1 | 6/2005 | Jing et al. |
| 2005/0137351 A1 | 6/2005 | Guerra |

FOREIGN PATENT DOCUMENTS

| | | |
|---|---|---|
| DE | 26 38 791 | 3/1977 |
| DE | 100 21 104 A1 | 11/2001 |
| EP | 0 048 964 A2 | 4/1982 |
| EP | 0 407 937 | 1/1991 |
| EP | 0 422 231 B1 | 12/1995 |
| EP | 1 085 038 A1 | 3/2001 |
| EP | 1 091 435 A1 | 4/2001 |
| EP | 1 179 548 A1 | 2/2002 |
| EP | 1 238 999 A1 | 9/2002 |
| EP | 1 359 142 A1 | 11/2003 |
| FR | 2 387 260 | 11/1978 |
| GB | 1184321 | 3/1970 |
| JP | 53-29291 | 3/1978 |
| JP | 53-97988 | 8/1978 |
| JP | 53-134088 | 11/1978 |
| JP | 54-52690 * | 4/1979 |
| JP | 56-72002 | 6/1981 |
| JP | SHO 60-250009 | 12/1985 |
| JP | SHO 62-288617 | 12/1987 |
| JP | 64-3140 | 1/1989 |
| JP | 5-314960 | 11/1993 |
| JP | 8-239494 | 9/1996 |
| JP | 2000-119420 | 4/2000 |
| JP | 2000-268834 | 9/2000 |
| JP | 2001-29800 | 2/2001 |
| JP | 2001-176524 | 6/2001 |
| JP | 2001-354641 | 12/2001 |
| JP | 2002-003466 | 1/2002 |
| JP | 2002-313364 | 10/2002 |
| WO | WO 94/03503 | 2/1994 |
| WO | WO 97/17381 | 5/1997 |
| WO | WO 99/38897 | 8/1999 |
| WO | WO 00/52060 | 9/2000 |
| WO | WO 01/27167 A1 | 4/2001 |
| WO | WO 01/87992 A2 | 11/2001 |
| WO | WO 01/96268 A2 | 12/2001 |
| WO | WO 02/50142 A1 | 6/2002 |
| WO | WO 02/062749 A1 | 8/2002 |
| WO | WO 02/087001 A2 | 10/2002 |
| WO | WO 02/103834 A1 | 12/2002 |
| WO | WO 03/004463 A1 | 1/2003 |
| WO | WO 03/022892 A2 | 3/2003 |

OTHER PUBLICATIONS

Gab-Jin Hwang et al.; "Preparation Of Cation Exchange Membrane As A Separator For The All-Vanadium Redox Flow Battery", Journal of Membrane Science, Elsevier Scientific Publ. Company, Amsterdam, NL, vol. 120, No. 1, Oct. 30, 1996. pp. 55-67.

* cited by examiner

POLYMER ELECTROLYTES CROSSLINKED BY E-BEAM

CROSS REFERENCE TO RELATED APPLICATIONS

This application is a divisional of U.S. Ser. No. 10/712,361, filed Nov. 13, 2003, now U.S. Pat. No. 7,179,847, the disclosure of which is incorporated by reference in its entirety herein.

FIELD OF THE INVENTION

This invention relates to a method of making a crosslinked polymer and the polymer so made, the method comprising the steps of: providing a highly fluorinated fluoropolymer, typically a perfluorinated fluoropolymer, comprising pendent groups which include a group according to the formula —$SO_2X$, where X is F, Cl, Br, OH, or —$O^-M^+$, where $M^+$ is a monovalent cation, and exposing said fluoropolymer to electron beam radiation so as to result in the formation of crosslinks.

BACKGROUND OF THE INVENTION

U.S. Pat. No. 4,230,549 purportedly discloses polymer membranes to be used in electrochemical cells produced by radiation grafting techniques.

U.S. Pat. Nos. 6,225,368 and 6,387,964 purportedly disclose monomer-grafted cross-linked polymers made by radiation cross-linking and grafting. In some embodiments, the monomer-grafted cross-linked polymer may be a fluoropolymer. In some embodiments, the monomer-grafted cross-linked polymer may then be sulfonated and used as an ion-exchange membrane in an electrochemical cell.

U.S. Pat. No. 6,255,370 purportedly discloses a solid polyelectrolyte fuel cell comprising a solid polyelectrolyte membrane, where the water content of the solid polyelectrolyte membrane is greater adjacent to the negative electrode. In one aspect, water content is purportedly controlled by controlling the degree of crosslinking in the membrane. The reference states, "when side chains are introduced into the film of a main chain copolymer, the material for the side chains or the crosslinking material is contacted with only one surface of the film, whereby the concentration of the side chains thus formed in the film or the degree of crosslinking in the film may be controlled in the intended manner." ('370, col. 5, lns. 57-61). Such treatment is followed by sulfonation. ('370, col. 6, lns. 31-48).

U.S. Pat. No. 5,260,351 purportedly discloses perfluoroelastomers cured by radiation in the absence of curing agents. The reference purportedly relates to curing of fully fluorinated polymers, such as those prepared from tetrafluoroethylene, a perfluoralkyl perfluorovinyl ether, and cure site or crosslinking units providing at least one of nitrile, perfluorophenyl, bromine or iodine in the resulting terpolymer.

SUMMARY OF THE INVENTION

Briefly, the present invention provides a method of making a crosslinked polymer comprising the steps of: providing a highly fluorinated fluoropolymer, typically a perfluorinated fluoropolymer, comprising pendent groups which include a group according to the formula —$SO_2X$, where X is F, Cl, Br, OH, or —$O^-M^+$, where $M^+$ is a monovalent cation, and exposing said fluoropolymer to electron beam radiation so as to result in the formation of crosslinks. The pendant groups are typically according to the formula —$R^1$—$SO_2X$, where $R^1$ is a branched or unbranched perfluoroalkyl or perfluoroether group comprising 1-15 carbon atoms and 0-4 oxygen atoms, and most typically —O—$(CF_2)_4$—$SO_2X$. Typically, the method according to the present invention additionally comprises the step of: forming said fluoropolymer into a membrane, typically having a thickness of 90 microns or less, more typically 60 microns or less, and most typically 30 microns or less. Typically, the electron beam radiation is in a dose of 4 Mrad or more, more typically 5 Mrad or more, and most typically 6 Mrad or more. Typically, the electron beam radiation is in a dose of less than 14 Mrad, and more typically less than 10 Mrad.

In another aspect, the present invention provides crosslinked polymers made according to any of the methods of the present invention.

What has not been described in the art, and is provided by the present invention, is a method of crosslinking a polymer comprising pendent groups which include a group according to the formula —$SO_2X$, where X is F, Cl, Br, OH, or —$O^-M^+$, typically a membrane for use as a polymer electrolyte membrane, using electron beam radiation.

In this application:

"equivalent weight" (EW) of a polymer means the weight of polymer which will neutralize one equivalent of base;

"hydration product" (HP) of a polymer means the number of equivalents (moles) of water absorbed by a membrane per equivalent of sulfonic acid groups present in the membrane multiplied by the equivalent weight of the polymer; and "highly fluorinated" means containing fluorine in an amount of 40 wt % or more, typically 50 wt % or more and more typically 60 wt % or more.

DETAILED DESCRIPTION

Figure 1:
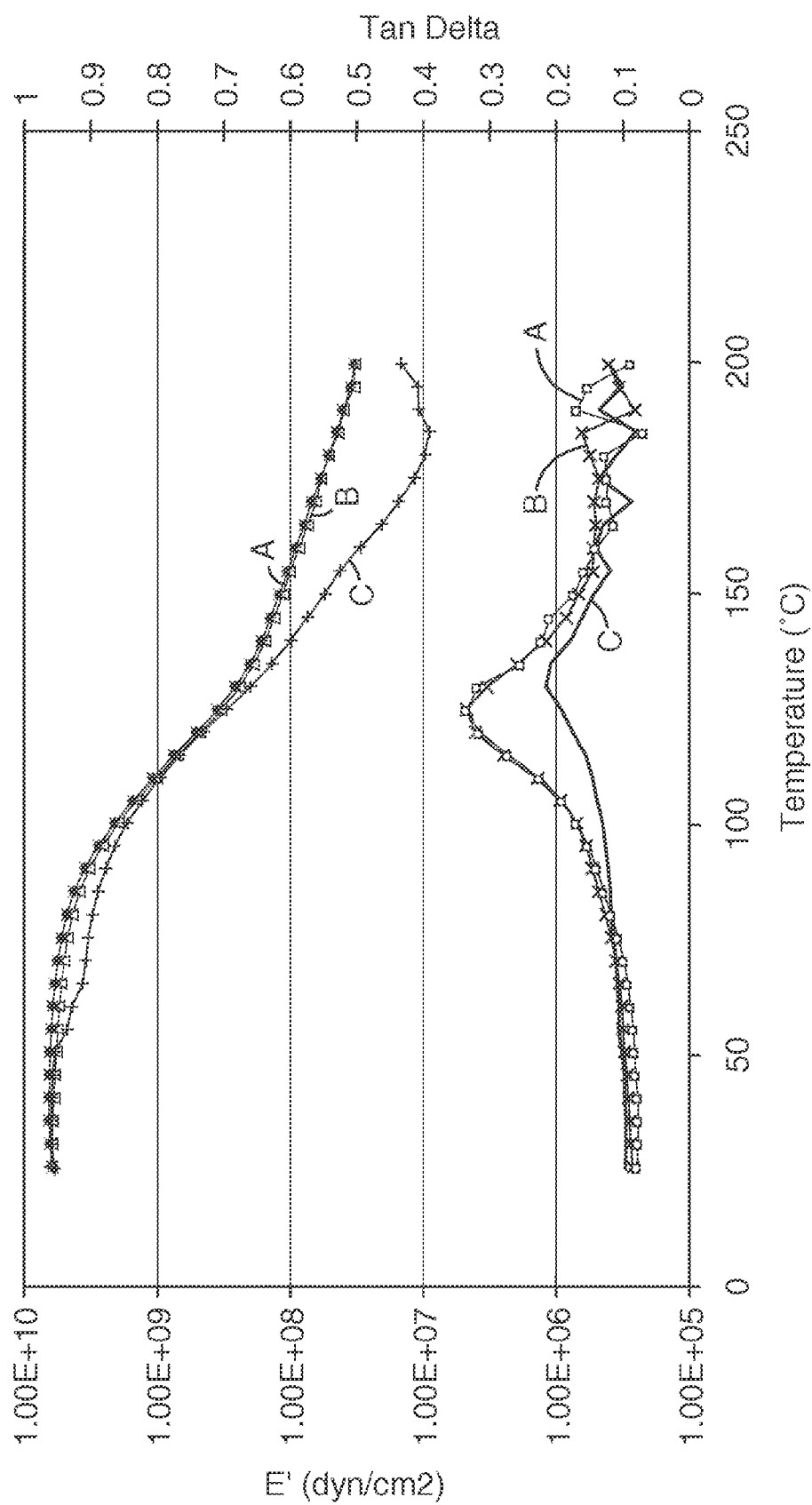
FIG. 1 is a graph showing dynamic mechanical analysis (DMA) results for two comparative polymers (A and B) and one polymer according to the present invention (C).

The present invention provides a method of making a crosslinked polymer. The polymer to be crosslinked comprises pendent groups which include a group according to the formula —$SO_2X$, where X is F, Cl, Br, OH, or —$O^-M^+$, where $M^+$ is a monovalent cation, typically an alkali metal cation such as $Na^+$, but most typically OH. Such polymers may be useful in the manufacture of polymer electrolyte membranes (PEM's), such as are used in electrolytic cells such as fuel cells.

PEM's manufactured from the crosslinked polymer according to the present invention may be used in the fabrication of membrane electrode assemblies (MEA's) for use in fuel cells. An MEA is the central element of a proton exchange membrane fuel cell, such as a hydrogen fuel cell. Fuel cells are electrochemical cells which produce usable electricity by the catalyzed combination of a fuel such as hydrogen and an oxidant such as oxygen. Typical MEA's comprise a polymer electrolyte membrane (PEM) (also known as an ion conductive membrane (ICM)), which functions as a solid electrolyte. One face of the PEM is in contact with an anode electrode layer and the opposite face is in contact with a cathode electrode layer. Each electrode layer includes electrochemical catalysts, typically including platinum metal. Gas diffusion layers (GDL's) facilitate gas transport to and from the anode and cathode electrode materials and conduct electrical current. The GDL may also be called a fluid transport layer (FTL) or a diffuser/current collector (DCC). The anode and cathode electrode layers may be applied to GDL's in the form of a catalyst ink, and the resulting coated GDL's sandwiched with a PEM to form a five-layer MEA. Alternately, the anode and cathode electrode layers may be applied to opposite sides of the PEM in the form of a catalyst ink, and the resulting catalyst-coated membrane (CCM) sandwiched with two GDL's to form a five-layer MEA. The five layers of a five-layer MEA are, in order: anode GDL, anode electrode layer, PEM, cathode electrode layer, and cathode GDL. In a typical PEM fuel cell, protons are formed at the anode via hydrogen oxidation and transported across the PEM to the cathode to react with oxygen, causing electrical current to flow in an external circuit connecting the electrodes. The PEM forms a durable, non-porous, electrically non-conductive mechanical barrier between the reactant gases, yet it also passes $H^+$ ions readily.

The polymer to be crosslinked comprises a backbone, which may be branched or unbranched but is typically unbranched. The backbone is highly fluorinated and more typically perfluorinated. The backbone may comprise units derived from tetrafluoroethylene (TFE) and units derived from co-monomers, typically including at least one according to the formula $CF_2=CY-R$ where Y is typically F but may also be $CF_3$, and where R is a pendent group which includes a group according to the formula $-SO_2X$, where X is F, Cl, Br, OH, or $-O^-M^+$, where $M^+$ is a monovalent cation, typically an alkali metal cation such as $Na^+$. X is most typically OH. In an alternative embodiment, side groups R may be added to the backbone by grafting. Typically, side groups R are highly fluorinated and more typically perfluorinated. R may be aromatic or non-aromatic. Typically, R is $-R^1-SO_2X$, where $R^1$ is a branched or unbranched perfluoroalkyl or perfluoroether group comprising 1-15 carbon atoms and 0-4 oxygen atoms. $R^1$ is typically $-O-R^2-$ wherein $R^2$ is a branched or unbranched perfluoroalkyl or perfluoroether group comprising 1-15 carbon atoms and 0-4 oxygen atoms. $R^1$ is more typically $-O-R^3-$ wherein $R^3$ is a perfluoroalkyl group comprising 1-15 carbon atoms.

Examples of $R^1$ include:

$-(CF_2)_n-$ where n is 1, 2, 3, 4, 5, 6, 7, 8, 9, 10, 11, 12, 13, 14 or 15

$(-CF_2CF(CF_3)-)_n$ where n is 1, 2, 3, 4, or 5

$(-CF(CF_3)CF_2-)_n$ where n is 1, 2, 3, 4, or 5$(-CF_2CF(CF_3)-)_n-CF_2-$ where n is 1, 2, 3 or 4

$(-O-CF_2CF_2-)_n$ where n is 1, 2, 3, 4, 5, 6 or 7

$(-O-CF_2CF_2CF_2-)_n$ where n is 1, 2, 3, 4, or 5

$(-O-CF_2CF_2CF_2CF_2-)_n$ where n is 1, 2 or 3

$(-O-CF_2CF(CF_3)-)_n$ where n is 1, 2, 3, 4, or 5

$(-O-CF_2CF(CF_2CF_3)-)_n$ where n is 1, 2 or 3

$(-O-CF(CF_3)CF_2-)_n$ where n is 1, 2, 3, 4 or 5

$(-O-CF(CF_2CF_3)CF_2-)_n$ where n is 1, 2 or 3

$(-O-CF_2CF(CF_3)-)_n-O-CF_2CF_2-$ where n is 1, 2, 3 or 4

$(-O-CF_2CF(CF_2CF_3)-)_n-O-CF_2CF_2-$ where n is 1, 2 or 3

$(-O-CF(CF_3)CF_2-)_n-O-CF_2CF_2-$ where n is 1, 2, 3 or 4

$(-O-CF(CF_2CF_3)CF_2-)_n-O-CF_2CF_2-$ where n is 1, 2 or 3

$-O-(CF_2)_n-$ where n is 1, 2, 3, 4, 5, 6, 7, 8, 9, 10, 11, 12, 13 or 14

R is typically $-O-CF_2CF_2CF_2CF_2-SO_2X$ or $-O-CF_2-CF(CF_3)-O-CF_2-CF_2-SO_2X$ and most typically $-O-CF_2CF_2CF_2CF_2-SO_2X$, where X is F, Cl, Br, OH, or $-O^-M^+$, but most typically OH.

The fluoromonomer according to formula I may be synthesized by any suitable means, including methods disclosed in U.S. Pat. No. 6,624,328.

The polymer to be crosslinked may be made by any suitable method, including emulsion polymerization, extrusion polymerization, polymerization in supercritical carbon dioxide, solution or suspension polymerization, and the like, which may be batchwise or continuous.

The acid-functional pendent groups typically are present in an amount sufficient to result in an hydration product (HP) of greater than 15,000, more typically greater than 18,000, more typically greater than 22,000, and most typically greater than 25,000. In general, higher HP correlates with higher ionic conductance.

The acid-functional pendent groups typically are present in an amount sufficient to result in an equivalent weight (EW) of less than 1200, more typically less than 1100, and more typically less than 1000, and more typically less than 900.

Typically, the polymer is formed into a membrane prior to crosslinking. Any suitable method of forming the membrane may be used. The polymer is typically cast from a suspension. Any suitable casting method may be used, including bar coating, spray coating, slit coating, brush coating, and the like. Alternately, the membrane may be formed from neat polymer in a melt process such as extrusion. After forming, the membrane may be annealed, typically at a temperature of 120° C. or higher, more typically 130° C. or higher, most typically 150° C. or higher. Typically the membrane has a thickness of 90 microns or less, more typically 60 microns or less, and most typically 30 microns or less. A thinner membrane may provide less resistance to the passage of ions. In fuel cell use, this may result in cooler operation and greater output of usable energy. Thinner membranes must be made of materials that maintain their structural integrity in use.

The step of crosslinking comprises the step of exposing the fluoropolymer to electron beam radiation so as to result in the formation of crosslinks. Typically, the electron beam radiation is in a dose of 4 Mrad or more, more typically 5 Mrad or more, and most typically 6 Mrad or more. Typically, the electron beam radiation is in a dose of less than 14 Mrad and more typically less than 10 Mrad. Any suitable apparatus may be used. A continuous process of exposure may be used to treat roll good membranes.

Optionally a crosslinking agent may be added. The crosslinking agent may be added by any suitable method, including blending with the polymer before forming into a membrane and application of the crosslinking agent to the membrane, e.g. by immersion in a solution of the crosslinking agent. Typical agents may include multifunctional compounds such as multifunctional alkenes, multifunctional acrylates, multifunctional vinyl ethers, and the like, which may be non-fluorinated or fluorinated to a low level but which are more typically highly fluorinated and more typically perfluorinated.

In a further embodiment, the polymer may be imbibed into a porous supporting matrix prior to crosslinking, typically in the form of a thin membrane having a thickness of 90 microns or less, more typically 60 microns or less, and most typically 30 microns or less. Any suitable method of imbibing the polymer into the pores of the supporting matrix may be used, including overpressure, vacuum, wicking, immersion, and the like. The blend becomes embedded in the matrix upon crosslinking. Any suitable supporting matrix may be used.

Typically the supporting matrix is electrically non-conductive. Typically, the supporting matrix is composed of a fluoropolymer, which is more typically perfluorinated. Typical matrices include porous polytetrafluoroethylene (PTFE), such as biaxially stretched PTFE webs.

It will be understood that polymers and membranes made according to the method of the present invention may differ in chemical structure from those made by other methods, in the placement of crosslinks, the placement of acid-functional groups, the presence or absence of crosslinks on pendent groups or of acid-functional groups on crosslinks, and the like.

This invention is useful in the manufacture of strengthened polymer electrolyte membranes for use in electrolytic cells such as fuel cells.

Objects and advantages of this invention are further illustrated by the following examples, but the particular materials and amounts thereof recited in these examples, as well as other conditions and details, should not be construed to unduly limit this invention.

EXAMPLES

Unless otherwise noted, all reagents were obtained or are available from Aldrich Chemical Co., Milwaukee, Wis., or may be synthesized by known methods.

Polymer

The polymer electrolyte used in the present examples was made by emulsion co-polymerization of tetrafluoroethylene (TFE) with $CF_2=CF-O-(CF_2)_4-SO_2F$ (MV4S), which was synthesized by the method disclosed in U.S. Pat. No. 6,624,328, the disclosure of which is incorporated herein by reference.

MV4S was preemulsified in water with APFO emulsifier (ammonium perfluorooctanoate, $C_7F_{15}COONH_4$) under high shear (24,000 rpm), using an ULTRA-TURRAX® Model T 25 disperser S25KV-25F (IKA-Werke GmbH & Co. KG, Staufen, Germany) for 2 min. A polymerization kettle equipped with an impeller agitator system was charged with deionized water. The kettle was heated up to 50° C. and then the preemulsion was charged into the oxygen-free polymerization kettle. At 50° C. the kettle was further charged with gaseous tetrafluoroethylene (TFE) to 6 bar absolute reaction pressure. At 50° C. and 240 rpm agitator speed the polymerization was initiated by addition of sodium disulfite and ammonium peroxodisulfate. During the course of the reaction, the reaction temperature was maintained at 50° C. Reaction pressure was maintained at 6 bar absolute by feeding additional TFE into the gas phase. A second portion of MV4S-preemulsion was prepared, as described above. The second preemulsion portion was fed continuously into the liquid phase during the course of the reaction.

After feeding additional TFE, the monomer valve was closed and the monomer feed interrupted. The continuing polymerization reduced the pressure of the monomer gas phase to about 2 bar. At that time, the reactor was vented and flushed with nitrogen gas.

The polymer dispersion thus obtained was mixed with 2-3 equivalents of LiOH and 2 equivalents of $Li_2CO_3$ (equivalents based on sulfonyl fluoride concentration) and enough water to make a 20% polymer solids mixture. This mixture was heated to 250° C. for four hours. Most (>95%) of the polymer became dispersed under these conditions. The dispersions were filtered to remove LiF and undispersed polymer, and then ion exchanged on Mitsubishi Diaion SKT10L ion exchange resin to give the acid form of the ionomer. The resulting polymer electrolyte is a perfluorinated polymer with acidic side chains according to the formula: $-O-(CF_2)_4-SO_3H$. The resulting mixture was an acid dispersion at 18 to 19% polymer solids. This dispersion was mixed with n-propanol and then concentrated in vacu to give the desired 20% solids dispersion in a water/n-propanol solvent mixture of about 30% water/70% n-propanol. This base dispersion was used to cast membranes.

Membranes

Polymer membrane samples for testing were cast by knife coating out of a water/propanol suspension (40% water/60% n-propanol) containing 20% solids onto a glass plate, dried at 80° C. for 10 minutes, and annealed at 200° C. for 10 minutes. The thickness of the resulting films was approximately 30 microns. The films were then removed from the glass plate, cut into strips, placed in polyethylene bags and purged with nitrogen.

E-Beam

The membrane samples were exposed to an e-beam source. (Energy Sciences CB300, Energy Sciences, Inc., Wilmington, Mass.). The dose was controlled to 2 Mrad per pass. Samples were subjected to 0, 1 or 3 passes for a total e-beam dose of 0, 2 or 6 Mrad.

Analysis

Tg was measured by dynamic mechanical analysis (DMA) for the samples exposed to e-beam doses of 0, 2 or 6 Mrad. In DMA, a sample of a polymer to be tested is clamped in a test apparatus that applies an oscillating force and measures the resulting displacement of the sample. The process is carried out in a temperature controlled environment. Temperature is ramped upward as measurements are taken. From this data, the apparatus typically calculates, records and displays the elastic modulus (E'), loss modulus (E"), and damping factor (tan delta) of the sample as a function of temperature. Tg is taken to be the maximum in tan delta.

In the present examples, a Rheometrics Solid Analyzer RSA II (TA Instruments, New Castle, Del., USA) was used at a frequency of 1 Hertz (6.28 rad/sec). A thin strip of sample was tested, measuring about 6.5 mm wide by about 25 mm long. Measurements were taken under tension over the temperature range of 25° C. to 200° C.

Figure 2:
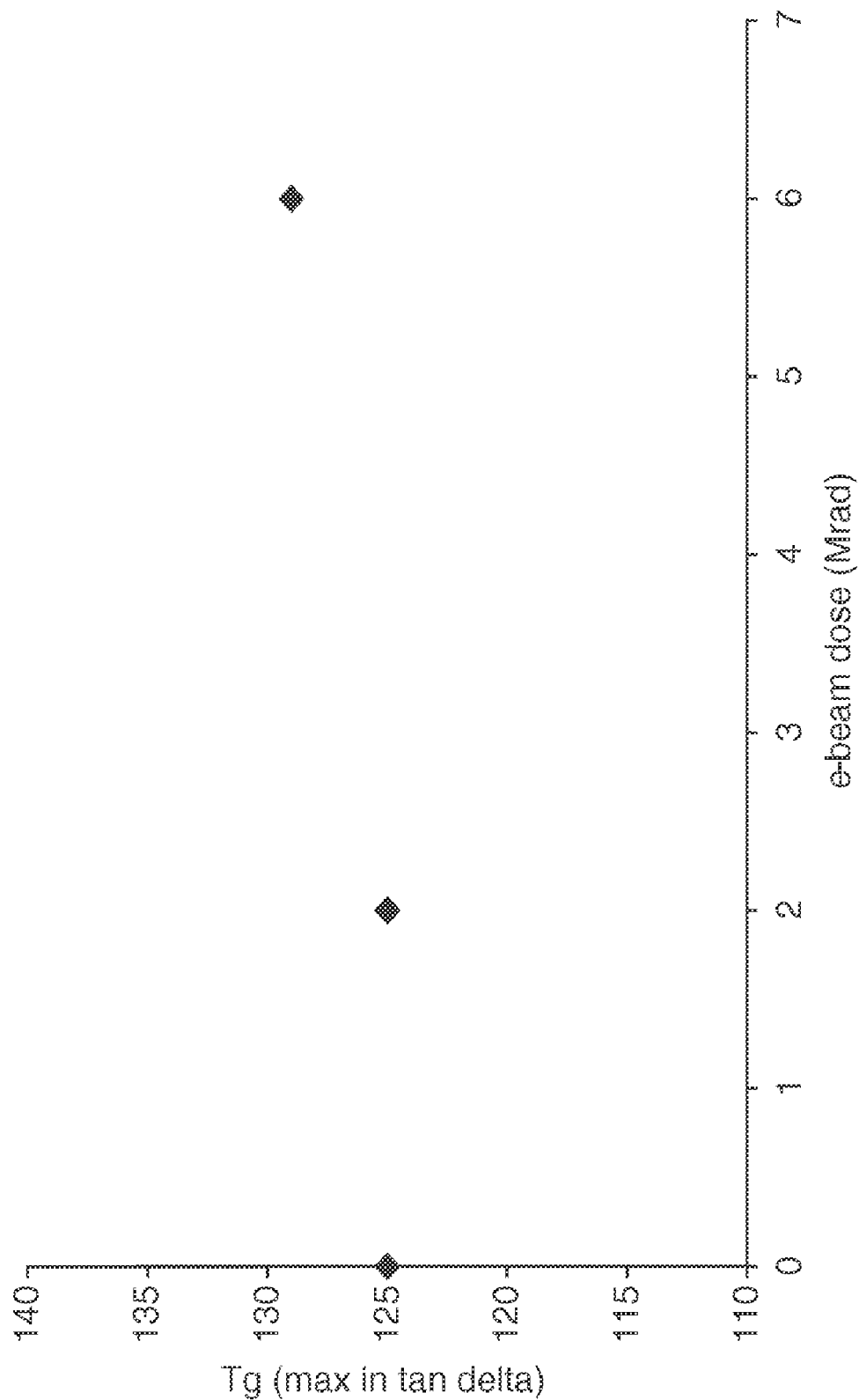
FIG. 2 is a graph showing Tg for two comparative polymers (0 Mrad and 2 Mrad) and one polymer according to the present invention (6 Mrad).

FIG. 1 is a graph showing DMA results at each dose. Trace A represents 0 Mrad (Comparative), trace B represents 2 Mrad (Comparative), and trace C represents 6 Mrad (Invention). FIG. 2 is a graph showing Tg at each dose, where Tg is taken as a maximum in the tan delta data represented in FIG. 1. Tg is elevated for the sample exposed to 6 Mrad of e-beam radiation, indicating that crosslinking has occurred.

Various modifications and alterations of this invention will become apparent to those skilled in the art without departing from the scope and principles of this invention, and it should be understood that this invention is not to be unduly limited to the illustrative embodiments set forth hereinabove.

We claim:

1. A method of making a crosslinked polymer comprising the steps of:
   a) providing a highly fluorinated fluoropolymer comprising pendent groups which include a group according to the formula $-SO_2X$, where X is F, Cl, Br, OH or $-O^-M^+$, where $M^+$ is a monovalent cation; and
   b) exposing said fluoropolymer to electron beam radiation so as to result in the formation of crosslinks wherein the step of exposing said fluoropolymer to electron beam irradiation comprises exposing said fluropolymer to greater than 4 Mrad of electron beam radiation.

2. The method according to claim 1 wherein said method additionally comprises, prior to said step b), the step of:
c) forming said fluoropolymer into a membrane.

3. The method according to claim 2 wherein said membrane has a thickness of 90 microns or less.

4. The method according to claim 1 wherein said highly fluorinated fluoropolymer is perfluorinated.

5. The method according to claim 1 wherein said pendent groups arc according to the formula —$R^1$—$SO_2X$, where $R^1$ is a branched or unbranched perfluoroalkyl or perfluoroether group comprising 1-15 carbon atoms and 0-4 oxygen atoms, and where X is F, Cl, Br, OH or —$O^-M^+$, where $M^+$ is a monovalent cation.

6. The method according to claim 1 wherein said pendent groups are groups according to the formula —O—$(CF_2)_4$—$SO_2X$, where X is F, Cl, Br, OH or —$O^-M^+$, where $M^+$ is a monovalent cation.

7. The method according to claim 6 wherein X is OH.

8. The method according to claim 2 wherein said pendent groups are according to the formula —$R^1$—$SO_2X$, where $R^1$ is a branched or unbranched perfluoroalkyl or perfluoroether group comprising 1-15 carbon atoms and 0-4 oxygen atoms, and where X is F, Cl, Br, OH or —$O^-M^+$, where $M^+$ is a monovalent cation.

9. The method according to claim 2 wherein said pendent groups are groups according to the formula —O—$(CF_2)_4$—$SO_2X$, where X is F, Cl, Br, OH or —$O^-M^+$, where $M^+$ is a monovalent cation.

10. The method according to claim 9 wherein X is OH.

11. The method according to claim 3 wherein said pendent groups are according to the formula —$R^1$—$SO_2X$, where $R^1$ is a branched or unbranched perfluoroalkyl or perfluoroether group comprising 1-15 carbon atoms and 0-4 oxygen atoms, and where X is F, Cl, Br, OH or —$0^-M^+$, where $M^+$ is a monovalent cation.

12. The method according to claim 3 wherein said pendent groups are groups according to the formula —O—$(CF_2)_4$—$SO_2X$, where X is F, Cl, Br, OH or —$O^-M^+$, where $M^+$ is a monovalent cation.

13. The method according to claim 12 wherein X is OH.

14. A polymer electrolyte membrane comprising the crosslinked polymer made according to the method of claim 1.

15. A polymer electrolyte membrane comprising the crosslinked polymer made according to the method of claim 2.

16. A polymer electrolyte membrane comprising the crosslinked polymer made according to the method of claim 3.

17. A polymer electrolyte membrane comprising the crosslinked polymer made according to the method of claim 4.

18. A polymer electrolyte membrane comprising the crosslinked polymer made according to the method of claim 5.

19. A polymer electrolyte membrane comprising the crosslinked polymer made according to the method of claim 6.

20. A polymer electrolyte membrane comprising the crosslinked polymer made according to the method of claim 7.

21. A polymer electrolyte membrane comprising the crosslinked polymer made according to the method of claim 8.

22. A polymer electrolyte membrane comprising the crosslinked polymer made according to the method of claim 9.

23. A polymer electrolyte membrane comprising the crosslinked polymer made according to the method of claim 10.

24. A polymer electrolyte membrane comprising the crosslinked polymer made according to the method of claim 11.

25. A polymer electrolyte membrane comprising the crosslinked polymer made according to the method of claim 12.

26. A polymer electrolyte membrane comprising the crosslinked polymer made according to the method of claim 13.

* * * * *

UNITED STATES PATENT AND TRADEMARK OFFICE
CERTIFICATE OF CORRECTION

PATENT NO. : 7,514,481 B2  Page 1 of 1
APPLICATION NO. : 11/668270
DATED : April 7, 2009
INVENTOR(S) : Michael A. Yandrasits It is certified that error appears in the above-identified patent and that said Letters Patent is hereby corrected as shown below:

<u>Title Page</u>

Item [56], References Cited, U.S. Patent Documents,
 delete "Schienoff" and insert -- Schlenoff -- therefor.

<u>Drawings</u>

Page 1, delete "(dyn/cm2)" and insert -- $(dyn/cm^2)$ -- therefor.

<u>Column 1</u>

Line 54, delete "perfluoralkyl" and insert -- perfluoroalkyl -- therefor.

<u>Column 7</u>

Claim 5, line 12, delete "arc" and insert -- are -- therefor.
Claim 11, line 37, delete "—0⁻" and insert -- —O⁻ -- therefor.

Signed and Sealed this

Ninth Day of June, 2009

JOHN DOLL
*Acting Director of the United States Patent and Trademark Office*